No. 851,594. PATENTED APR. 23, 1907.
A. C. HIGGINBOTHAM.
DRILL OR AUGER.
APPLICATION FILED JULY 3, 1906.

2 SHEETS—SHEET 1.

Witnesses
Geo Ackman Jr.
C. C. Hines

Inventor
A. C. Higginbotham,
By Victor J. Evans
Attorney

THE NORRIS PETERS CO., WASHINGTON, D. C.

No. 851,594. PATENTED APR. 23, 1907.
A. C. HIGGINBOTHAM.
DRILL OR AUGER.
APPLICATION FILED JULY 3, 1906.

2 SHEETS—SHEET 2.

Witnesses
Geo Ackman Jr.
C. C. Hines.

Inventor
A. C. Higginbotham
By Victor J. Evans
Attorney

UNITED STATES PATENT OFFICE.

ALLEN C. HIGGINBOTHAM, OF DECOTA, WEST VIRGINIA, ASSIGNOR OF ONE-HALF TO CHAS. A. CABELL, OF CARBON, WEST VIRGINIA.

DRILL OR AUGER.

No. 851,594.      Specification of Letters Patent.      Patented April 23, 1907.

Application filed July 3, 1906. Serial No. 324,697.

*To all whom it may concern:*

Be it known that I, ALLEN C. HIGGINBOTHAM, a citizen of the United States of America, residing at Decota, in the county of Kanawha and State of West Virginia, have invented new and useful Improvements in Drills or Augers, of which the following is a specification.

This invention relates to improvements in coal drills or augers, its object being to provide simple, novel and efficient means for driving the drill spindle and feeding said spindle forwardly in the operation of drilling, the construction being such as to enable a variable automatic feed action to be obtained to feed the spindle fast or slow under varying conditions of service.

Figure 1:
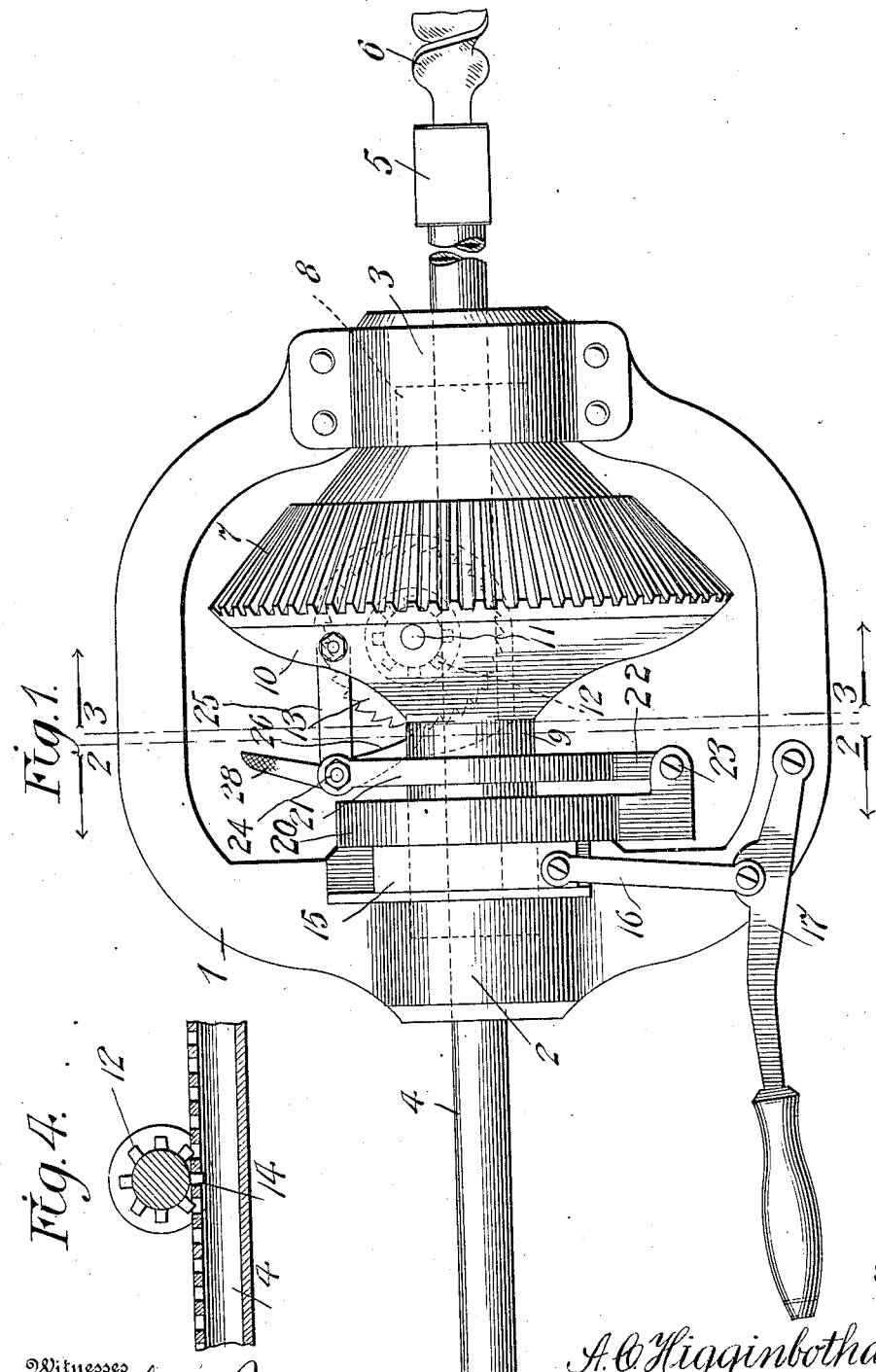
Figure 2:
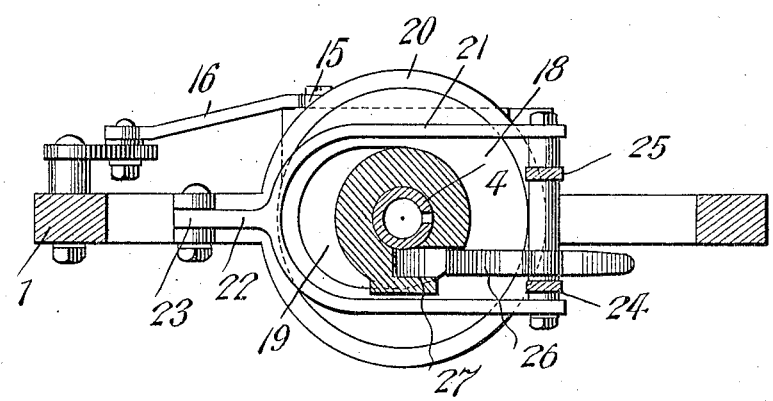
Figure 3:
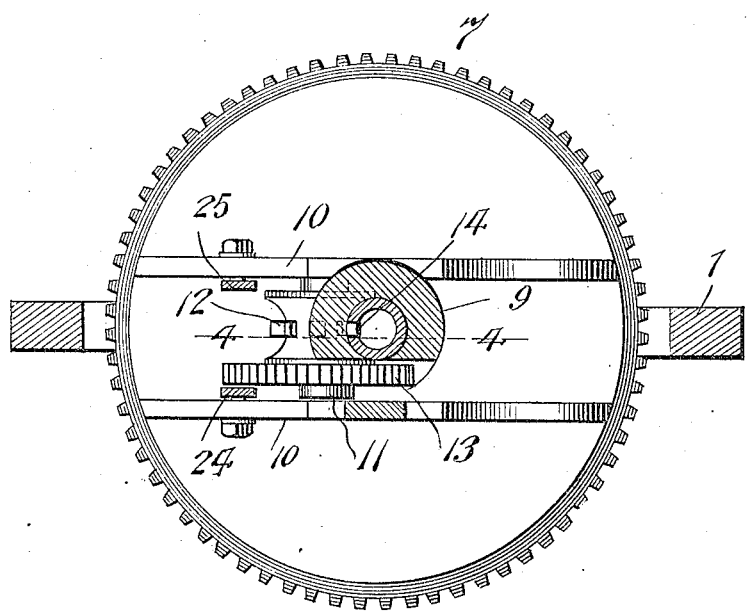

In the accompanying drawings,—Figure 1 is a view in elevation of a drill embodying my invention. Fig. 2 is a transverse section on line 2—2 of Fig. 1, looking rearwardly toward the eccentric. Fig. 3 is a similar view on line 3—3 of Fig. 1, looking toward the drive gear. Fig. 4 is a detail longitudinal section on line 4—4 of Fig. 3.

Referring to the drawings, 1 designates an open frame provided with diametrically opposite bearings 2 and 3 for the tool spindle 4, which extends longitudinally therethrough, said spindle being preferably of hollow or tubular form and provided at its forward end with a reinforcing sleeve or chuck 5 receiving the shank of the drill bit or auger 6.

Inclosed within the frame and loosely mounted on the shaft is a drive gear 7, which may be operated in any preferred manner, as by an electric motor, not shown, on the frame. The gear is provided at its forward end with a journal 8 turning in a recess in the front frame-bearing 3 and provided at its rear end with a hub or extension 9 journaled at its extreme rear end in a recess in the frame-bearing 2.

The gear 7 is provided on its rear side with a transverse radial slot or recess forming parallel flanges 10 in which is journaled a shaft 11 on which is fixed for rotation therewith a spur feed gear 12 and a ratchet-wheel 13, the ratchet wheel being of larger diameter than the gear so as to secure a relatively slow rotation of the latter. The gear 12 partially turns within a slot in the hub 9, and its teeth are adapted to engage slots or teeth 14 formed in or upon the spindle 4, whereby upon the rotation of said gear in a rearward direction the spindle will be fed forward, as will be readily understood. The ratchet wheel fits partially within a recess on one side of the hub 9, both the feed and ratchet wheels being mounted to revolve with the drive gear 7, the feed gear acting to lock the spindle to the drive gear so that it will rotate therewith.

Mounted on the frame to move at right angles to the spindle is a slide 15 operatively connected by a link 16 with a pivoted operating lever 17. The slide is rigidly connected with an eccentric 18 formed with a radial slot 19 for the passage of the hub 9 of the wheel 7, which slot permits the eccentric to be shifted laterally of or at right angles to said hub and the tool spindle to vary its axial relation therewith. A ring or strap 20 is mounted to turn upon the stationary eccentric 18 and supports a vibratory yoke 21, said yoke being provided at its closed end with an arm 22 pivoted to an extension on one side of the ring or strap, as indicated at 23, so as to allow the yoke to swing longitudinally of the tool in an arc crossing the plane of rotation of the spindle. The free ends of the arms of the yoke carry a pivot bolt 24 connected by links 25 with the flanges 10 of the drive gear, thus adapting the yoke to reciprocate in a fixed plane and coupling the yoke and eccentric strap or ring to rotate with the drive gear. The bolt 24 also pivotally supports a feed pawl 26, whose toothed end is free to move in a slot or recess 27 formed in the hub 9 to engage the teeth of the ratchet wheel 13. The pawl has an arm or finger piece 28 by which it may be manually thrown out of engagement with the ratchet wheel when it is desired to release the feed gear to permit the spindle to be retracted.

In the operation of the device, the gear 7 on rotating, transfers motion to the spindle 4, which turns without a forward feed movement as long as the eccentric occupies the normal position shown in Fig. 2, in which its axis is concentric with the axis of the spindle, the arrangement being such that in the rotation of the strap 20 in such a concentric path the yoke 21 will simply turn with the revolving parts without reciprocating. By, however, shifting the extension 18 to vary its position to a greater or less extent relative to the axis of the spindle and hub of the gear the strap in its rotation will correspondingly reciprocate the yoke 21 to a greater or less degree, thus causing the pawl to engage the ratchet wheel and feed the spindle forward fast or slow as occasion may require.

The invention thus provides a simple and convenient form of driving and spindle feeding mechanism which is under the thorough control of the operator at all times.

Having thus described the invention, what is claimed as new, is:—

1. In a device of the character described, the combination with a frame, and a rotating tool spindle, of a drive gear loosely mounted on the spindle, a feed gear carried by the driving gear and engaging the spindle, feed mechanism for intermittently rotating the feed gear, and means for varying the operation of said feed gearing to impart a greater or less degree of motion to the feed gear.

2. In a device of the character described, the combination of a frame, a rotating tool spindle, a drive gear loose on said spindle, a feed gear carried by the drive gear and having a toothed engagement with the spindle to impart a feed movement thereto, pawl and ratchet mechanism for actuating said feed gear, and operating means for automatically actuating said pawl and ratchet mechanism, said operating means being adjustable to regulate the throw of the pawl.

3. In a device of the character described, the combination of a frame, a rotating tool spindle, a drive gear loose on said spindle, a feed gear carried by the drive gear and having a toothed engagement with the spindle for imparting a forward feed movement thereto, pawl and ratchet mechanism for actuating said feed gear, a reciprocating device for imparting motion to the pawl thereof, and operating means for reciprocating said device, said means being adjustable to regulate the extent of reciprocating action.

4. In a device of the character described, the combination of a frame, a rotating tool spindle, a drive gear loose on said spindle, a feed gear carried by the drive gear and having a toothed engagement with the spindle to couple the drive gear thereto and impart feed motion to the spindle, pawl and ratchet mechanism for actuating said gear, an eccentric for reciprocating the pawl, and means for adjusting the eccentric to vary the throw of the pawl in its reciprocation.

5. In a device of the character described, the combination of a frame, a rotating tool spindle, a drive gear loose on said spindle, a feed gear carried by the drive gear and having a toothed engagement with the spindle to couple the drive gear thereto and impart feed motion to the spindle, a relatively stationary eccentric, means rotative with the drive gear and including a pawl and ratchet to operate the feed gear actuated by the eccentric to feed the spindle, and means for adjusting the eccentric to vary the action of the pawl and ratchet mechanism.

6. In a device of the character described, the combination of a frame, a rotating tool spindle, a drive gear loose on the spindle, a feed wheel carried by the gear and meshing with the spindle, pawl and ratchet mechanism for operating the feed wheel, an eccentric for reciprocating the pawl, and means for varying the throw of the eccentric.

7. In a device of the character described, the combination of a frame, a rotary tool spindle, a drive gear loose thereon, a feed wheel carried by the gear and meshing with the spindle, a ratchet wheel connected with the feed wheel, a reciprocating pawl for operating the ratchet wheel, a relatively fixed eccentric, a member rotatable thereon, a connection between said member and pawl for imparting rotary movement to the latter, and means for shifting the eccentric to vary the action of the pawl through said rotatable member and connection.

8. In a device of the character described, the combination of a frame, a rotary tool spindle, a drive gear loose on said spindle and carrying a feed gear meshing therewith, a pawl connected with the feed wheel, a yoke pivotally connected with the drive gear and carrying a pawl to engage the ratchet wheel, an eccentric on the frame, a strap controlled by said eccentric to reciprocate the yoke, and means for shifting the eccentric to vary the motion of the strap and the degree of reciprocation of the yoke.

In testimony whereof, I affix my signature in presence of two witnesses.

ALLEN C. HIGGINBOTHAM.

Witnesses:
 E. C. HANNA,
 GEO. W. BRYANT.